Nov. 5, 1968  J. W. MITCHELL ET AL  3,409,291

FLAT LAY STACKER

Filed Feb. 6, 1967

INVENTORS
JOHN W. MITCHELL
ARTHUR C. BERGERON
BY
*Richard P. Crowley*
ATTORNEY

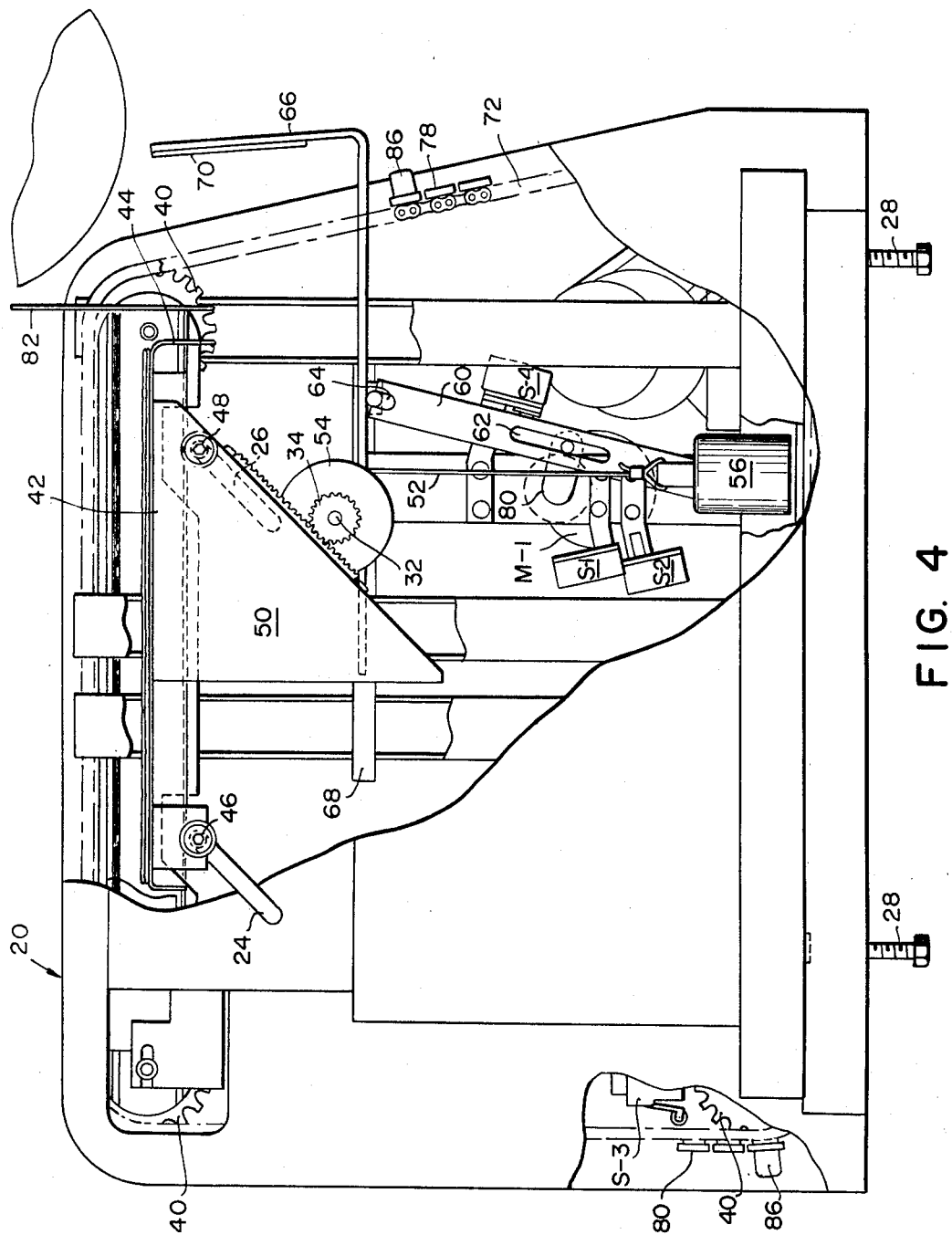

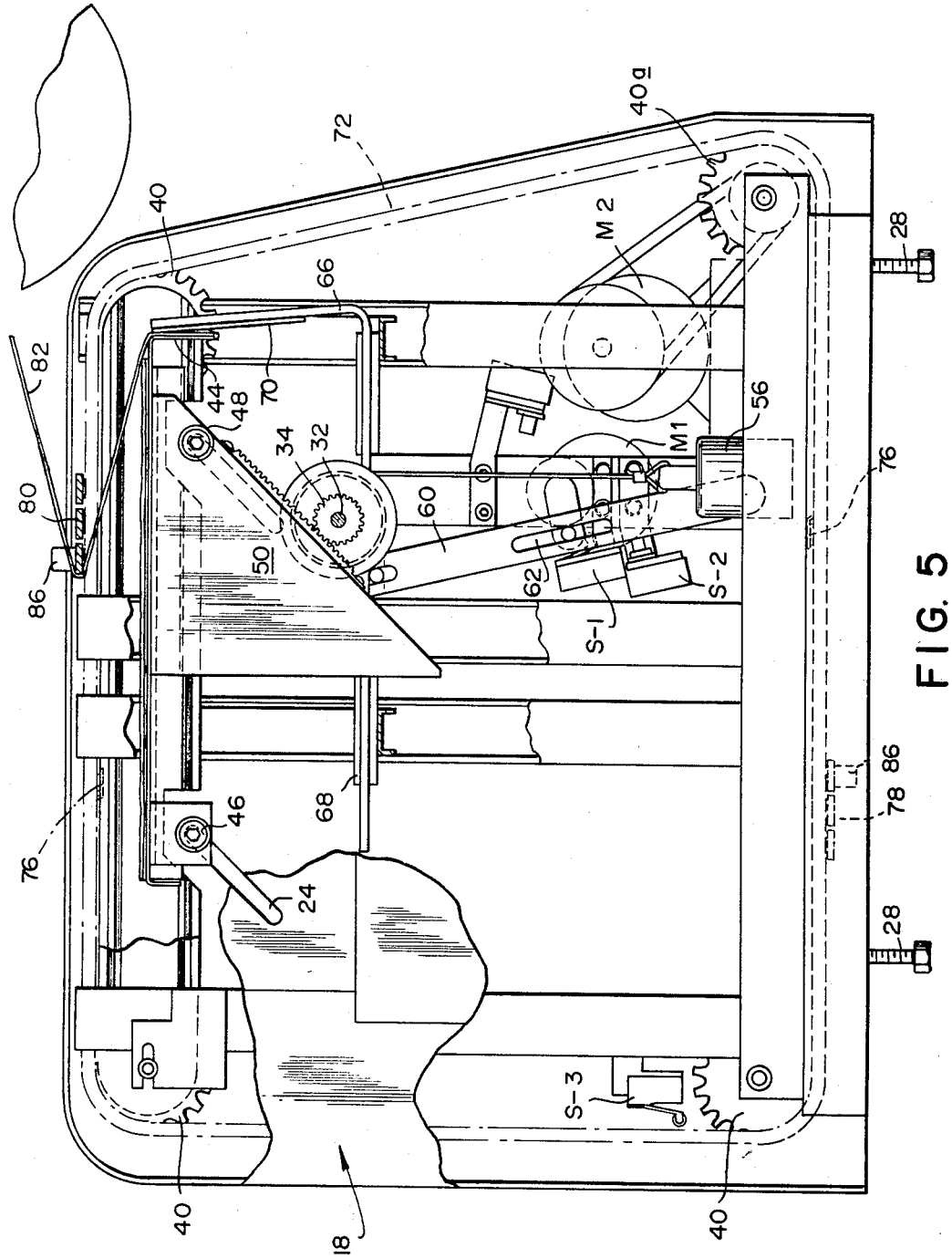

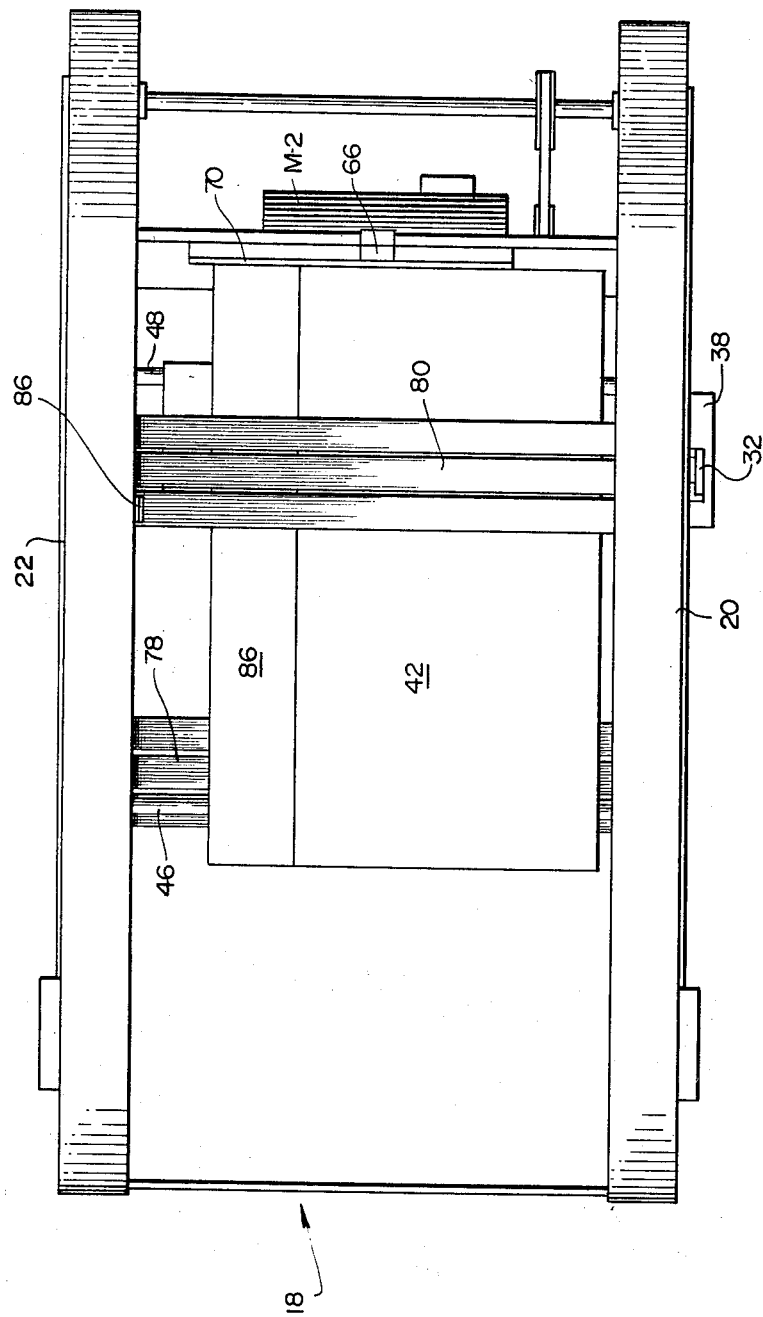

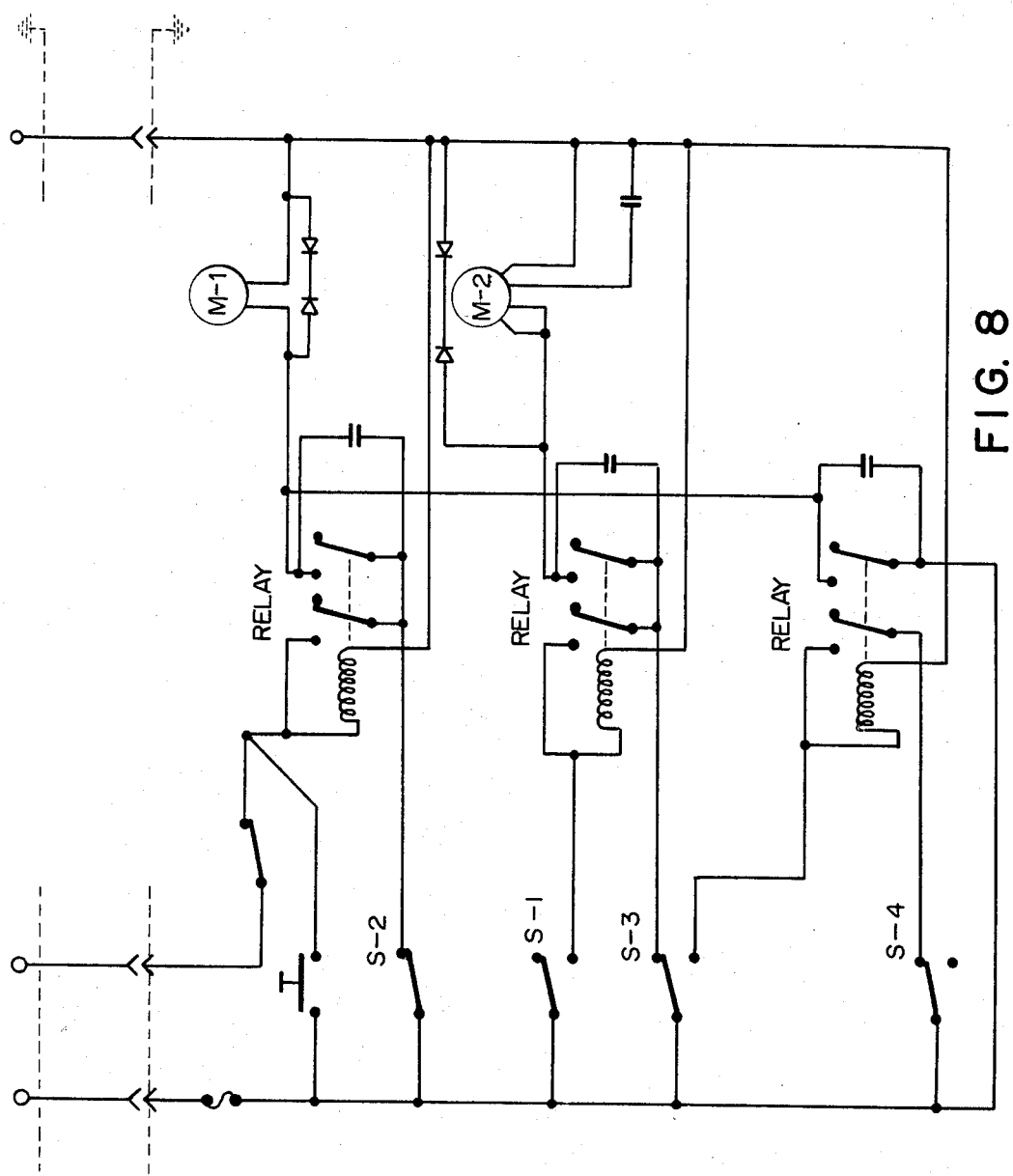

United States Patent Office 3,409,291
Patented Nov. 5, 1968

3,409,291
FLAT LAY STACKER
John W. Mitchell, Somerset, and Arthur C. Bergeron, Seekonk, Mass., assignors to A. J. Mitchell Co., Fall River, Mass., a corporation of Massachusetts
Filed Feb. 6, 1967, Ser. No. 614,169
10 Claims. (Cl. 271—3)

ABSTRACT OF THE DISCLOSURE

A flat lay stacker device for placing individual pieces of flexible sheet material such as shirt fronts one upon the other in a registered relationship so that the stacked pieces have the leading edges even when placed on a flat surface. The stacker includes a frame, a flat platform which is moved downwardly at a 45° angle in an indexed manner as pieces are laid down on the platform, a clamp which moves between an open and a closed or clamping position to grasp the leading edge of the piece material fed to the stacker, and a traveling bar which travels in one direction circumscribing the platform of the stacker which lays down the piece held by the clamp onto the flat platform. The clamp and bar operating in conjunction with motive means to lower the platform along a 45° path and in combination with a work piece indexing device which feeds pieces to the stacker.

Background of the invention

Our invention relates to an automatic device for stacking a plurality of individual flexible sheet material pieces in a registered relationship onto a flat platform. More particularly, our invention concerns a mechanically-aided flat lay stacker which receives and automatically stacks shirt fronts onto a flat platform which is indexed downwardly along a 45° path as the shirt pieces are stacked onto the platform.

In the garment and other industries, there are many sequential operations performed on shirt material pieces such as hemming, folding, button sewing, snap fastening and the like, to produce the finished product. During a particular operation such as button sewing, the fabric material such as a shirt front must be accumulated or collected in some orderly and efficient manner for the next sequential operation. If the shirt fronts are allowed to accumulate in a basket or a haphazard manner then it becomes time consuming and costly to prepare or arrange the shirt fronts in a stacked pile for the next operation. It is therefore desirable to have shirt fronts collected in a stacked registered relationship, and in a predetermined amount, with the leading edge of each shirt front aligned when on a flat surface so they are ready for the next operation. One means for accumulating uniform sized materials has been suggested wherein a gripper holds the leading edge of material and a finger, traveling back and forth across the top of the platform where the material is being accumulated, lays the material onto the platform (see U.S. Patent No. 3,163,415). This device is not entirely satisfactory since the means that lays down the material travels back and forth over the material it has just laid down, so that there is a possibility that the material may be caught by such rearward motion. Such device is also complex and requires the use of air jets which is unfeasable in some operations.

Summary of the invention

We have discovered a new and unique method and apparatus for stacking individual flexible pieces of sheet material such as shirt fronts in registered relationship which is simple in construction and efficient and economical to operate.

Our invention will be described in connection with and has particular advantages in the stacking of shirt fronts. However, our method and stacker is not limited to shirt fronts or any other particular item and may be employed in stacking various other textile items such as drapes, napkins, towels, flags and the like.

Our flat lay stacker may be operated alone or preferably in combination with a work indexing device such as a fabric positioning device described in our copending United States patent application Ser. No. 426,665 filed Jan. 19, 1965, now Patent No. 3,336,222. A particular advantageous combination includes an operative combination of a conventional sewing machine, a button or an article feeding device for feeding buttons to the sewing machine for a sewing operation onto a fabric (see U.S. Patents Nos. 2,836,324 and 2,921,544), and a fabric positioning device for sequentially and automatically indexing the fabric into the proper sewing position for the sewing operation.

In our flat lay stacker, the leading edge of a fabric article fed to the stacker is gripped by a clamp adjacent the platform on which the fabric is to be stacked. With the edge so clamped, a laying element or bar travels in a circumferential direction about the platform and picks up the free hanging end of the fabric piece, and carries it up and over its clamped edge and lays the fabric onto the flat platform. The laying element travels in one direction under and over the platform stopping after the fabric has been laid down, while the clamp moves to the open position for the receipt of the next fabric piece. As each fabric is stacked on the platform, the platform is indexed away and downwardly along a 45° path when the clamp moves to the next closed position. The movement of the platform is caused by the clamp pressing the material against the forward edge of the platform, thus making the movement equal to the thickness of the material. The unidirectional travel of the laying means and the automatic 45° travel of the platform avoid many of the complexities and difficulties associated with prior art stackers. In this manner, fabric articles such as shirt fronts are stacked with the leading edges in registered relationship to one another at a 45° angle. This makes it possible to have the leading edges of all the stacked items flush or even when removed from the platform and placed on a flat surface.

Therefore, it is an object of our invention to provide an improved device for stacking individual flexible sheet materials of uniform size in registered relationship to one another.

Another object of our invention is to provide a flat lay stacker such as for shirt fronts which is a significant improvement over the prior art and which operates in combination with a fabric positioning device.

Another object of our invention is to provide a flat lay stacker such as for shirt fronts wherein the means which lays down the shirt front, travels in one direction only circumscribing the platform on which the shirt parts are stacked.

Another object of our invention is to provide a flat lay stacker for shirt fronts which can be operated in combination with other apparatus such as a conventional sewing machine, button feeding machine and a fabric positioning device. These and other objects of our invention will be apparent to those persons skilled in the art from a more detailed description and the accompanying drawings in which:

Brief description of the drawings

FIG. 4 is a sectional side view of our stacker with the clamp means in the open position and having certain cut away portions.

FIG. 5 is the same view as shown in FIG. 4 with the clamping means in the closed position.

FIG. 7 is a top view of our stacker.

FIG. 8 is a schematic diagram illustrating the electric circuit and components used in our stacker.

*Description of the preferred embodiments*

Figure 1:
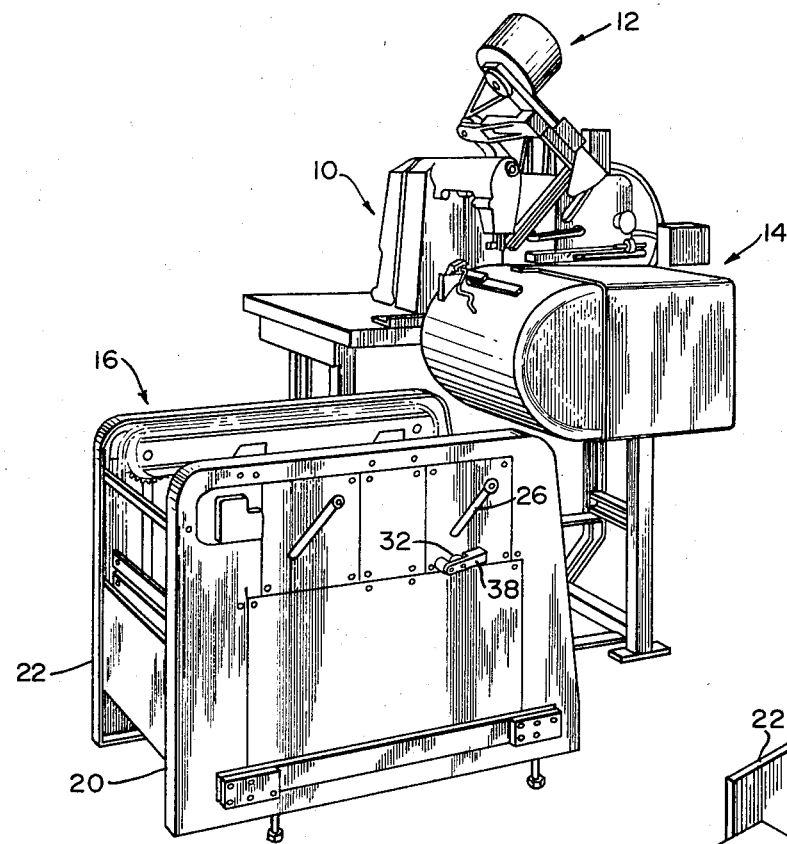
FIG. 1 shows the flat lay stacker in combination with a conventional sewing machine, a button feeding means and a fabric position device.

Briefly, our invention comprises in combination; a frame with slotted sides; a platform on which to stack material which is secured to the frame and adapted to move downwardly at a 45° angle, in an indexed manner, allowing the successive leading edges of the material to be stacked in registered relationship to one another at a 45° angle; a material clamping means which operates between an open and closed position, to secure the material being fed to the stacking device to the edge of the platform; stacking or laying down elements which rotate above and below the platform to pick up the free hanging portion of the material, carrying the material over its leading edge, which is secured by the clamp in the closed position to the platform, and to lay the material on the platform; means to release and position the clamp for reception of the next fabric; means to rotate the stacking element and further means to coordinate the functions of the feeding device, the material clamp and the laying down elements.

When a fabric material such as a shirt front is fed to the flat lay stacker the leading edge of the material drops between the front edge of the platform and the material clamp which clamp is in the open position. The feeding device which may be a part of a combination of a button or snap feeding device; a sewing machine and a fabric positioning device is synchronized in operation with the flat lay stacker. When the sewing or snap fastening operation is completed on the shirt front the flat lay stacker is actuated and the material clamp moves to the closed position securing the fabric between the clamp and the edge of the platform. The remaining fabric from the feeding element hangs free from the secured position between the material clamp and the platform. As the material clamp moves to the closed position, a relay is actuated causing the laying elements to rotate around the frame 180°. One of the laying elements, which element is secured to belts one on either side of the frame, moves up toward and outside the clamped material picking up the other end of the fabric material. The laying element follows a path up in front of and then over the material clamp and then down over the platform, so that the fabric material is carried up and over its own leading and clamped edge and laid down on the flat platform. The laying element stops and actuates a relay which causes the material clamp to move to the open position completing one cycle.

The next shirt front drops between the front edge of the platform and the material clamp, which is in the open position. When actuated by the fabric position device the material clamp moves to the closed position securing the shirt front to the platform, however, each time the material clamp moves to the closed position it returns to exactly the same position. As shirt fronts build up on the platform, the platform moves downwardly and away from its original position at the 45° slotted angle in the frame and is indexed. When the leading edge of each successive shirt front is drawn by the material clamp towards the front of the platform it comes in contact with that portion of the shirt fronts that are already stacked which portion is draped over the front of the platform. Making contact at this point the leading edge of the shirt front becomes secured and the material clamp continues moving until it reaches its closed position. This continued movement of the clamp after the leading edge of the shirt front has been secured moves the platform down and away from its former position. A counter balance attached to the moving platform maintains the proper tension of the platform as the shirt fronts accumulate to control the downward movement of the platform. A friction lock secures the platform in position after each movement of the platform to prevent any unwarranted upward movement.

The distance the material clamp travels is constant in each cycle. The distance that the leading edge of the shirt front drops down before being pulled by the material clamp is constant and the distance from the leading edge of the shirt front to the inside of the material clamp just prior to the activation of the material clamp to the closed position is also constant. Therefore, with the material clamp returning to the same closed position each time a shirt front is stacked, the platform moves down away at a 45° angle causing each successive leading edge of the shirt fronts to be accumulated at a 45° angle as they are successively secured in registered relationship over the front edge of the platform. When the maximum capacity of the flat lay stacker has been reached if the shirt fronts are removed and placed on a flat table all the leading edges of the shirt fronts will be even or aligned one to the other and ready for the next operation. The release of a friction lock permits the platform to rise to its original level for the next loading operation.

Another feature of our invention is a depression along one side of the platform. The stacking of shirt fronts after the buttons have been sewn causes a disproportionate thickness in the shirt fronts, therefore, as each shirt front is stacked, the side with the buttons lays over the depressed area so that an inordinate build up of the material will not occur prematurely.

In its preferred embodiment as shown in FIG. 1, our invention comprises the combination of: a sewing device 10 such as a conventional needle type sewing machine, a sequential article feeding device 12 such as a snap fastener or button feeding means to feed an article to the sewing machine nest such as to feed a button to be sewn on a shirt front, and a work indexing device 14 to sequentially position the fabric for the sewing of the article in a desired position and our stacking device 16 to receive the finished fabric from the work indexing device and to permit the stacking of the finished pieces in an end aligned position providing for the efficient and economical feeding, sewing, indexing and stacking operation.

With reference to the drawings, our stacker includes, a frame 18 with horizontally aligned side panels 20 and 22 characterized by a pair of 45° slotted openings 24 and 26 on each panel, support members 28 and 30, and a rod 32 rotatably secured to each panel which rod passes through gears 34 and 36 and a disc element 54 with a slotted outer edge. A friction type locking device 38 is secured to the panel 20 about one end of the rod 32, and toothed discs or gears 40 are rotatably secured to each corner of the frame.

A platform 42 on which to stack shirt fronts includes, a front edge 44, a depression 84 along one side, support members 46 and 48 which are slidably fitted into the slots 24 and 26, and a pair of 45° triangular plates 50 with one edge of each plate secured to the bottom of the platform 42 at either side at the platform their planes perpendicular to the plane of the platform and parallel to the side panels 20 and 22, which plates 50 are characterized by having a plurality of teeth on the hypotenuse which mesh with the gears 34–36. A cord 52 is attached to the bottom of the platform 42 which cord is wound around the grooved disc 54 and has a counterweight 56 secured to the other end thereof.

A clamp arrangement to secure the leading edge of a shirt front 82 to the front edge 44 of the platform 42 comprises an arm 60 pivotally attached at its base which arm is characterized by a slotted opening 62 generally in the center thereof and further characterized by an opening 64 at the top thereof. An L-shaped arm 66 is pivotally attached in the opening 64 of the arm 60 and one leg of which rests on a support member 68 and lies under and is parallel to the platform 42. The other leg of the arm 66 is characterized by a flat clamp element 70 secured thereto which element is flush with the front edge 44 of the platform when the clamp is in the closed position.

Figure 6:
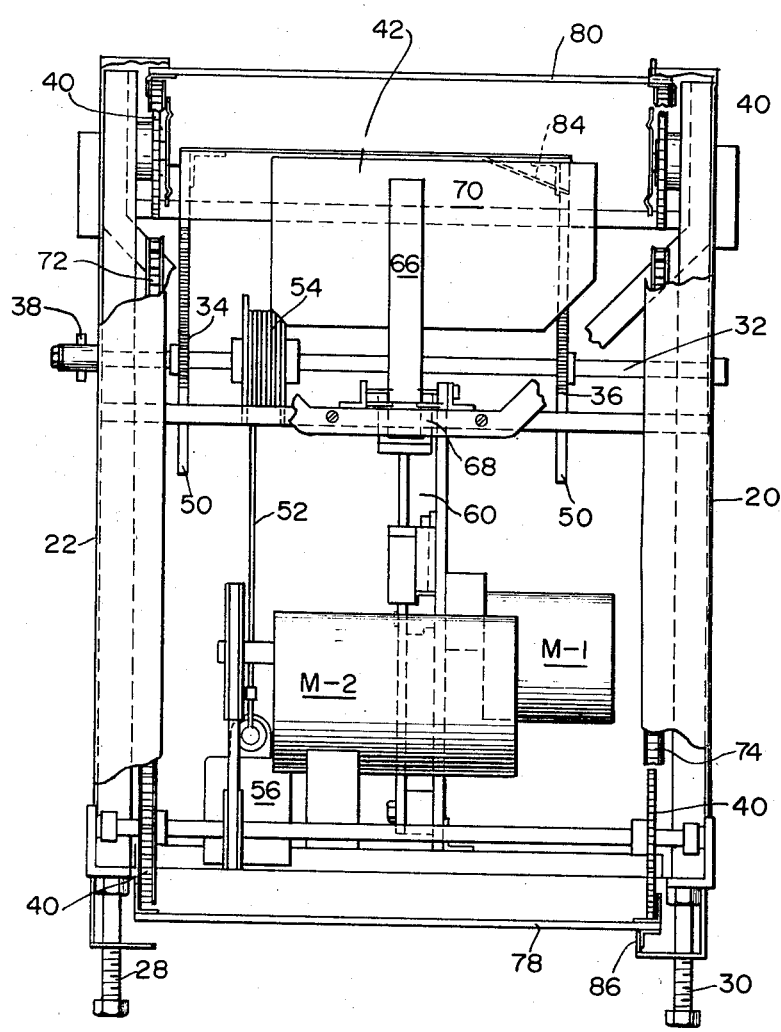
FIG. 6 is a front view of our stacker with cut away portions.

Laying elements 78 and 80 are each comprised of a plurality of narrow slats. The first or leading slat in each set has on one end adjacent the chain element 74 a guiding means 86 (see FIG. 6). The laying elements are secured approximately 180° apart to the endless chain elements 72 and 74. The chain elements one on either side of the frame rotate around the gears 40. Chain element 74 is characterized by two raised projections or pins 76 approximately 180° apart and located approximately six inches ahead of the first slat.

A means to synchronize the operation of the reciprocal action of the clamp and the rotary action of the laying means includes a clamp motor M-1 to receive a signal to commence the cycle and to drive the clamp in reciprocal motion, a rack motor M-2 to drive the laying means in rotary motion, a rack motor switch S-1, clamp advance stop switch S-2, clamp retract signal and rack motor stop switch S-3, and a clamp retract stop switch S-4.

In the operation of our invention the leading edge 82 of a shirt front from the rotary fabric positioner, drops between the front edge of the platform 44 and the clamp 70 as shown in FIG. 4. When the last operation of the Sequential Sewing Apparatus is completed an electrical impulse is sent to the clamp motor M-1. The motor through an armature 80 which is pivotally connected to the slotted opening 62 in the arm 60 drives the arm 60 from right to left. This arm is rotatably connected to one leg of the L shaped arm 66. When the vertical arm 60 moves from right to left this causes the transistory motion of the arm 66 which slides in a groove in support element 68 from right to left or from the open to the closed clamping position. As the clamp moves toward the closed position, as shown in FIG. 5, it carries the leading edge of the shirt front toward the front edge of the platform 44.

The vertical arm 60 passes by and actuates the rack motor switch S-1 and continues on its path until it strikes the clamp advance stop switch S-2. At this point the clamp 70 is in the closed position and the leading edge of the shirt front is secured between the platform front 44 and the clamp 70. When the arm 60 actuates the rack motor switch S-1 an impulse is sent to the rack motor M-2 to drive the laying means. The rack motor M-2 is connected by a belt or other means to the gear 40a as shown in FIG. 5, and drives the gears 40 causing the chain elements 72 and 74 to rotate in a peripheral unidirectional path.

Figure 3:
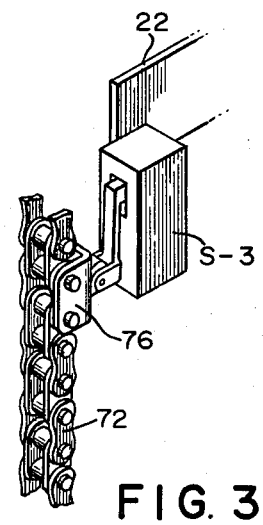
FIG. 3 is a fragmentary view of an actuating means.

The laying elements 78 and 80 are each comprised of three narrow slats closely spaced to one another to provide a flexible arrangement for moving around the circumference of the gears 40. The laying element 80 moves up toward the clamp 70 which is in the closed position and passes in front of the clamp contacting the shirt front. The laying element then turns 90° and follows a path over the platform and turns 90° and then down the other side of the frame. In this manner the shirt front is carried over its own leading edge by the laying element 80 and laid on the platform as shown in FIG. 5. The guiding means 86 insures that the shirt front is laid down in a uniform manner. When the rack has traveled approximately 180° from its initial position the pin 76 on the chain 74 strikes the clamp retract signal and rack motor stop switch S-3, which is a dual switch (see FIG. 3). This sends an impulse to the clamp motor M-1 which drives the clamp to the open position, the arm 60 of the clamp moving from left to right until it strikes the clamp retract stop switch S-4. Also, an impulse is sent to the rack motor stopping the laying means. One cycle is now completed and the clamp is in the open position, as in FIG. 4.

When the next impulse is received by the clamp motor M-1 from the Sequential Sewing Apparatus, the clamp 70 moves to the closed position securing the leading edge of the next shirt front to the front of the platform as described above. However, the leading edge of the next successive shirt front is secured slightly above the prior leading edge, because the clamp travels the same distance each time as each shirt front is accumulated, and the platform is moved downwardly from the clamp at a 45° angle. The indexed downward movement of the platform is caused by the clamp pressing the material of each successive shirt front against the portion of the shirt front which is already draped over the front edge of the platform. At this point the shirt front becomes secured and the clamp continues moving to the closed position forcing the platform downwardly at a 45° angle said movement approximately equal to the thickness of the material. The platform 42 has support elements 46 and 48 which are slidably fitted in the slots 24 and 26 in the side panels 20 and 22. The hypotenuse of each 45° triangular plate 50 is characterized by a plurality of teeth. These teeth mesh with the gears 34 and 36 on the rod 32 as shown in FIG. 4. On the same support rod 32 as the gears 34 and 36, is a disc having a grooved outer edge in which the cord 52 winds around. At the end of the cord 52 is a counter weight 56 which acts as a counter-balance to offset the accumulated weight of shirt fronts and prevents premature depression of the platform. A friction type lock 38, shown in FIG. 1, surrounds one end of the rod 32 and secures the platform in position after each downward movement allowing the platform to descend freely, but preventing any undesired upward movement during operation.

Figure 2:
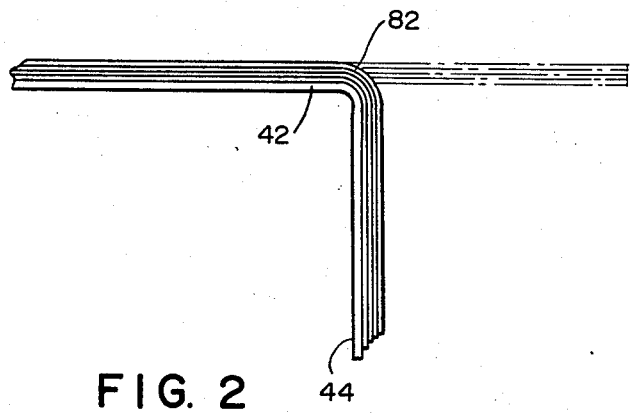
FIG. 2 is a fragmentary sectional view of accumulated fabric material layers in registered relationship to one another.

As each successive shirt front is secured by the clamp the platform 44 moves downwardly from its original position at a 45° angle in an indexed manner causing the leading edges of the stacked shirt fronts to accumulate in registered relationship to one another at a 45° angle as shown in FIG. 2. When the shirt fronts are removed and placed on a flat surface all the leading edges are even.

As the shirt fronts are stacked on the platform the edge of the shirt front with the buttons is laid over the tapered side 84 of the platform 42. This is to compensate for the additional thickness of the buttons.

Our invention has been described in combination with an article feeding device, a sewing machine and a fabric positioner apparatus which feeds the shirt front to the stacker, however, any means may be used to feed flexible sheet material to our flat lay stacker.

Our invention as described and illustrated is a significant improvement over the prior art in that shirt fronts are accumulated in a fast economical and efficient manner, in registered relationship to one another with the leading edges accumulated at a 45° angle.

What is claimed is:

1. A flat lay stacking device for stacking a plurality of flexible individual sheet materials onto a flat surface in predetermined registered relationship to one another which device comprises in combination:
   (a) a frame;
   (b) a platform supported on the frame and adapted to move along a predetermined angular path;
   (c) means to move and guide the platform downwardly in the predetermined angular path in an indexed manner;

(d) clamping means adapted for transverse movement between an open and closed position in relationship to one end of the platform;

(e) laying down means including a bar element adapted to move in a peripheral, continuous, unidirectional path over and under the platform from a first laying to a second non-laying position;

(f) motive means to move the platform, the clamping means and the laying down means; and (g) means responsive to a signal to sequentially react the motive means whereby;

when a piece of flexible sheet material is fed to the flat lay stacker its leading edge between the one end of the platform and the clamping means which is in the open position, the clamping means is actuated to move to the closed position securing the leading edge of the material to the one end of the platform and moving the platform down a predetermined amount along an angular path, the bar element of the laying down means is actuated to travel around the platform and lay down the material onto the platform, and the clamping means is actuated to return to the open position.

2. The apparatus of claim 1 wherein the frame includes a pair of side panels characterized by a slotted opening in each panel of 45° and the platform is secured to and adapted for movement between said panels and in said slotted path.

3. The apparatus of claim 1 wherein the frame includes a pair of side panels characterized by a pair of slotted openings in said panel, a plurality of support elements extending across the platform and secured thereto to include a means to secure each end of the support element to the slotted paths in a movable manner, whereby the platform moves downwardly along the path described by said slotted openings.

4. The apparatus of claim 1 wherein the frame includes a counter balance means for the platform whereby premature descension of the platform is prevented.

5. The apparatus of claim 1 wherein the platform is characterized by a depression therein whereby material of non-uniform thickness may be accumulated without a disproportionate build-up of material.

6. The apparatus of claim 1 wherein the motive means includes a first signal producing means, a first electric motor responsive to said first signal to actuate the clamp means to the closed position, a second signal producing means, a second electric motor responsive to said second signal to actuate the bar element of the laying down means between a laying and non-laying position and a third signal producing means to stop the second electric motor and to actuate the first electric motor whereby the first electric motor receives a first signal to actuate the clamping means to the closed position securing sheet material between the clamp and the one end of the platform and lowering the platform, a second signal actuates the second electric motor to move the laying down means from the non-laying to the laying position laying the sheet material on the platform, and after the laying down means has traveled from the laying to the non-laying position a third signal stops the second electric motor and actuates the first electric motor to drive the clamping means to the open position.

7. The apparatus of claim 1 wherein the frame includes a pair of side panels characterized by a pair of 45° slotted openings in each side, a platform characterized by a depressed section on one side, a pair of support elements extending across said frame and supporting said platform, the ends of said support elements slidably secured to the said slotted openings, a counter balance means for the platform, two electrical motors, and relay means to actuate the motors whereby the platform moves downwardly along a 45° angular path causing successive sheets of material to be accumulated in registered relationship to one another.

8. The apparatus of claim 7 wherein the platform has at least one 45° triangular plate secured to the bottom thereof and the hypotenuse of said plate is characterized by a plurality of teeth and at least one of the support elements is characterized by at least one gear which gear meshes with the hypotenuse edge of the said plate.

9. The apparatus of claim 1 wherein the laying down means includes two bar elements positioned approximately 180° apart whereby when one bar element is in laying down position the other is in a non-laying position.

10. The apparatus of claim 1 wherein the bar element of the laying down means is comprised of a plurality of narrow slats, the slats extending across the entire width of the platform and driven by an endless chain belt about the platform.

References Cited

UNITED STATES PATENTS 3,163,415  12/1964  Atchison _____ 271—68

RICHARD E. AEGERTER, *Primary Examiner.*